(12) United States Patent
Salvucci, Jr.

(10) Patent No.: US 8,087,679 B1
(45) Date of Patent: Jan. 3, 2012

(54) HANDCART

(76) Inventor: Frank Salvucci, Jr., Bakersfield, CA (US)

( * ) Notice: Subject to any disclaimer, the term of this patent is extended or adjusted under 35 U.S.C. 154(b) by 0 days.

(21) Appl. No.: 12/869,482

(22) Filed: Aug. 26, 2010

(51) Int. Cl.
*B62B 1/00* (2006.01)

(52) U.S. Cl. ............... 280/47.35; 280/47.18; 280/47.26; 280/654; 280/79.3

(58) Field of Classification Search .... 280/47.18–47.19, 280/47.26–47.27, 47.34, 5.32, 654, 79.11, 280/79.3, 43.11, 47.131, 47.17, 79.4–6; 16/35 R; 414/454, 490
See application file for complete search history.

(56) References Cited

U.S. PATENT DOCUMENTS

| | | | |
|---|---|---|---|
| 1,542,327 A | | 6/1925 | Slingsby |
| 1,896,249 A | * | 2/1933 | Russell ...................... 280/47.35 |
| 3,701,463 A | * | 10/1972 | Goss ............................ 294/142 |
| 3,828,392 A | * | 8/1974 | Bolger .......................... 16/35 R |
| 3,857,579 A | | 12/1974 | Hoodenpyle |
| 3,977,602 A | | 8/1976 | Kirch |
| 4,179,132 A | * | 12/1979 | Rich ........................... 280/47.26 |
| 4,187,950 A | * | 2/1980 | Peet .............................. 414/421 |
| 4,302,894 A | * | 12/1981 | Emma ............................. 37/434 |
| 4,435,115 A | * | 3/1984 | Orstad et al. ................. 414/490 |
| 4,776,603 A | * | 10/1988 | Watts .......................... 280/47.27 |
| 5,113,546 A | | 5/1992 | Parent |
| D404,877 S | * | 1/1999 | Popham ......................... D34/24 |
| D423,173 S | * | 4/2000 | Horner et al. ................... D34/24 |
| 6,059,127 A | | 5/2000 | Bennett |
| 6,109,625 A | | 8/2000 | Hewitt |
| 6,116,623 A | * | 9/2000 | Salvucci ..................... 280/47.26 |
| D440,727 S | * | 4/2001 | Keller et al. .................... D34/24 |
| 6,223,691 B1 | | 5/2001 | Beattie |
| 6,368,048 B2 | | 4/2002 | Womble et al. |
| D473,989 S | * | 4/2003 | Hittle ............................. D34/18 |
| D473,990 S | | 4/2003 | Hittle |
| D477,900 S | * | 7/2003 | Ditmars, Jr. ................... D34/24 |
| D480,527 S | * | 10/2003 | Kollen ........................... D34/21 |
| D523,608 S | * | 6/2006 | Brubacher et al. ............. D34/24 |

(Continued)

FOREIGN PATENT DOCUMENTS

JP 2001-180496 7/2001

(Continued)

OTHER PUBLICATIONS

Website, http://www.completeturncarts.com/CTC4-CylinderCart 9-9.asp, three-wheeled cart for pressurized cylinders, two sheets printed from the internet on Jun. 14, 2010.

(Continued)

*Primary Examiner* — J. Allen Shriver, II
*Assistant Examiner* — James Triggs
(74) *Attorney, Agent, or Firm* — Richard C. Litman

(57) ABSTRACT

The handcart has various embodiments, each embodiment having a pair of larger wheels at the back of the load-carrying platform and a rear axle located above the plane of at least the forward portion of the platform. Smaller caster wheels are mounted on arms extending forward and outward from the forward corners of the platform. The outward ends of the arms are displaced upwardly to place the platform bottom only very slightly higher than the bottoms of the forward casters, thus increasing stability by lowering the center of gravity of the cart and contents, and facilitating loading and unloading of the cart due to the very low platform. The cart need not be tilted rearward to lift the platform from the floor, but may be pushed over the underlying surface with the load-carrying platform remaining level and with all four wheels rolling over the underlying surface.

6 Claims, 5 Drawing Sheets

U.S. PATENT DOCUMENTS

| | | | |
|---|---|---|---|
| 7,252,297 | B1 | 8/2007 | Barritt et al. |
| 7,273,216 | B1 * | 9/2007 | Hohrman .................... 280/79.5 |
| 7,357,398 | B2 | 4/2008 | O'Connor |
| D570,068 | S | 5/2008 | Dukes |
| 7,374,185 | B1 | 5/2008 | Hollis |
| D578,270 | S * | 10/2008 | Mulka et al. .................. D34/21 |
| D603,121 | S * | 10/2009 | Schwager ..................... D34/18 |
| 7,661,683 | B2 | 2/2010 | Fernandez |
| D632,042 | S * | 2/2011 | Hittle et al. .................. D34/18 |
| 2002/0014753 | A1 | 2/2002 | Cheng |
| 2004/0108669 | A1 * | 6/2004 | Tsai ........................... 280/47.29 |
| 2006/0119059 | A1 * | 6/2006 | O'Connor .................... 280/47.35 |
| 2008/0191437 | A1 | 8/2008 | Staub |
| 2008/0197592 | A1 | 8/2008 | Dukes |
| 2009/0152826 | A1 | 6/2009 | Silva et al. |
| 2010/0320710 | A1 * | 12/2010 | Dufour ....................... 280/47.24 |

FOREIGN PATENT DOCUMENTS

JP    2009-005702    1/2009

OTHER PUBLICATIONS

Website, http://www.callpisfirst.com/carts.htm, series of six hand carts for pressurized cylinders, one sheet printed from the internet on Jun. 14, 2010.

Website, http://www.anthonycarts.com, Product Catalog, pp. 1-28, © 2007.

* cited by examiner

HANDCART

BACKGROUND OF THE INVENTION

1. Field of the Invention

The present invention relates generally to carts, and more specifically, to a handcart having forward casters that are longitudinally and laterally offset outwardly from the forward corners of the platform for greater stability, and are further vertically offset upward to allow the platform to be as low as possible above the underlying surface.

2. Description of the Related Art

Handcarts, hand trucks, and similar manually operated conveyances have been known and used for a considerable period of time to facilitate the transport of limited loads over limited distances and terrain. Examples of such usage are the movement and positioning of heavy articles of furniture and appliances from a motorized truck to a home or office, the delivery of heavy paper goods (copier supplies, books, etc.) to home or office, etc.

Such carts are also often specialized for use in the storage and transport of cylinders of compressed gas, e.g., oxygen and acetylene cylinders for oxyacetylene welding, etc. Such carts conventionally have a pair of relatively large diameter, non-steerable wheels at the rear of their load platforms, with the axle raised to allow the load-carrying platform to rest on the surface when the platform is horizontal and the cart and contents are upright. This greatly facilitates the movement of cylinders (or other articles) on and off the platform, but requires that the cart be tilted rearward to raise the platform above the surface for movement by means of the rear wheels. A person moving the cart must not only provide the energy required for moving the cart, but must also maintain the angle of the cart in order to at least approximately balance the load on the rear wheels. This can be tricky when the cart must be moved over rough or uneven surfaces, and a wheel catches momentarily on some discontinuity in the surface.

As a result, a number of handcarts have been constructed with a smaller caster wheel beneath each of the front corners of the platform. The installation of the caster wheels beneath the platform obviously raises the platform above the supporting surface to a height at least slightly greater than the diameters of the casters. While the casters are usually of relatively small diameter, i.e., only a very few inches, this positioning of the platform some distance above the underlying surface can make it quite difficult to load or unload a very heavy object onto or from the platform.

An example of such is found in Japanese Patent No. 2001-180,496 published on Jul. 3, 2001. This reference describes (according to the drawings and English abstract) a folding cart. The drawings show relatively large, rearwardly disposed main wheels with their axles below the bottom of the cart, and smaller diameter caster wheels located beneath the forward corners of the cart.

Additionally, Japanese Patent No. 2009-005,702 published on Jan. 15, 2009, describes (according to the drawings and English abstract) a handcart for use in watering plants. The cart includes a pair of relatively large wheels at the rear of the cart and below the floor of the platform, with a pair of smaller diameter casters beneath the front corners of the platform.

None of the above inventions and patents, taken either singly or in combination, is seen to describe the instant invention as claimed. Thus, a handcart solving the aforementioned problems is desired.

SUMMARY OF THE INVENTION

The handcart comprises a series of different configurations, differing primarily in their upper structures. In each configuration or embodiment, the lower portion of the structure comprises a platform having a pair of large diameter rearwardly disposed wheels having their axle located above at least the lowermost portion of the load-carrying platform. A smaller diameter caster wheel is mounted on an arm that extends forwardly and outwardly from each forward corner of the platform. The outboard ends of the arms are displaced upwardly from the plane of the load-carrying platform, thus placing the bottom of the load-carrying platform barely above the bottoms of the wheels. This configuration allows articles to be loaded onto and unloaded from the platform without undue effort, and also allows the cart to be moved without needing to tilt the cart back and balance the load on the rear wheels. The outward and forward placement of the smaller casters also greatly increases stability in comparison to such smaller wheels located beneath the platform, as in many other carts. Brakes may be provided on the casters, if so desired.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The handcart described herein comprises various embodiments of a four-wheeled handcart having a lower, load-carrying platform positioned between the wheels in order to place the platform only a very slight distance above the underlying surface. This allows various bulky and/or heavy articles, e.g., pressurized cylinders of oxygen and acetylene for welding, etc., to be placed upon and removed from the cart without requiring them to be lifted to any great degree. Moreover, the cart may be moved without need to tilt it rearward, as is the case with conventional carts, wherein the platform rests directly upon the underlying surface when the cart is upright.

Figure 1:
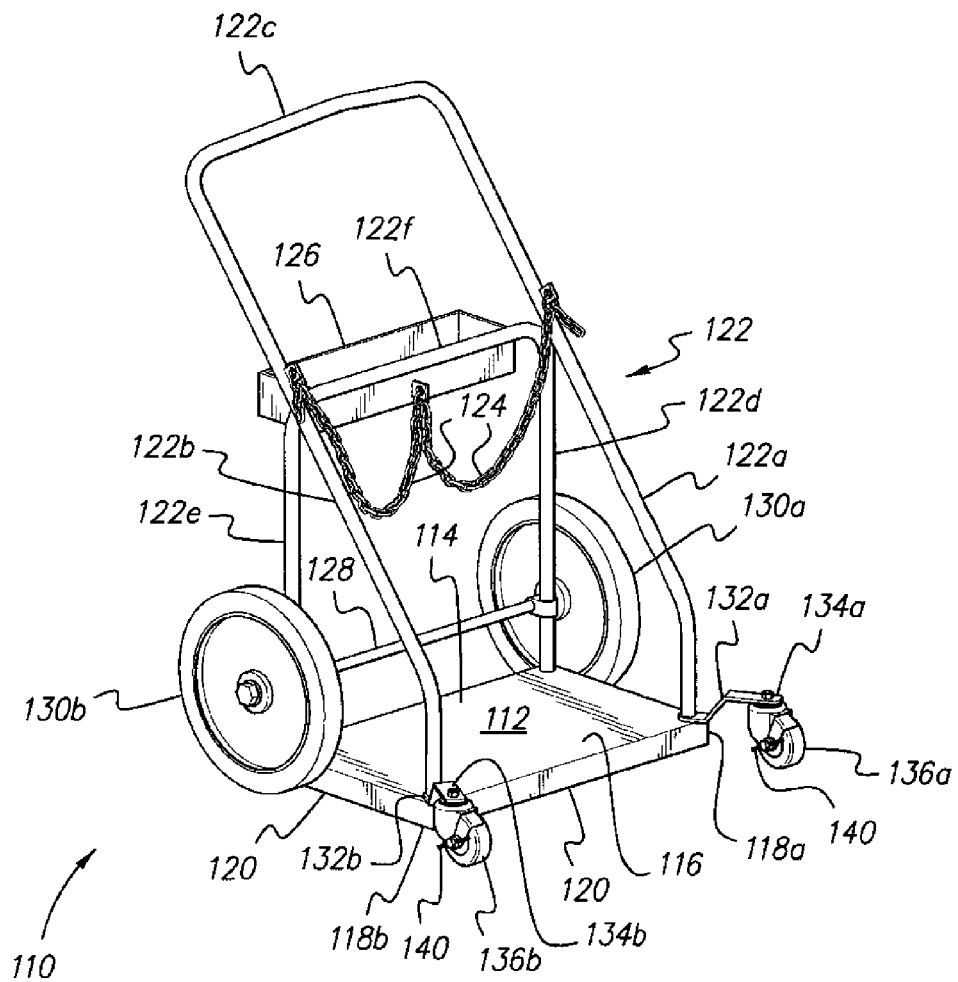
FIG. 1 is a perspective view of a first embodiment of a handcart according to the present invention, shown from the right front and illustrating various details thereof.

FIG. 1 of the drawings provides a perspective view of a first embodiment of the handcart 110. The handcart or cart 110 is adapted or configured particularly for the carriage of pressurized cylinders thereon, e.g., welding cylinders, but it will be understood that the cart 110 may be readily adapted for the carriage of other articles or objects as well, if desired. The cart 110 includes a flat, planar load-carrying platform 112 formed of a relatively thin and unbroken sheet of metal or other suitable material. The platform 112 includes a rear portion 114, an opposite forward portion 116, a left front corner 118a, and a right front corner 118b. The periphery of the platform includes a downwardly bent lower flange or edge 120 serving to stiffen the platform structure.

A superstructure 122 extends upwardly from the platform 112. In the case of the handcart 110 of FIG. 1, the superstructure 122 includes forwardly disposed left and right members 122a and 122b that extend upwardly and rearward from the forward corners 118a, 118b of the platform 112, with a rearwardly disposed handle 122c joining the upper ends of the two members 122a, 122b. Similarly configured (but shorter) left and right rear members, respectively 122d and 122e, extend upwardly from the rear corners of the platform 112 and are joined by a crossmember 122f that extends generally medially across the two forward members 122a, 122b. The various components 122a through 122f may be formed of tubular steel material, or may alternatively be formed of other structural material as desired. Additional structure may be provided, e.g., cylinder retaining chains 124, an accessory tray 126 for holding a striker, different welding tips and/or tip cleaning tools, etc., as desired.

Figure 4:
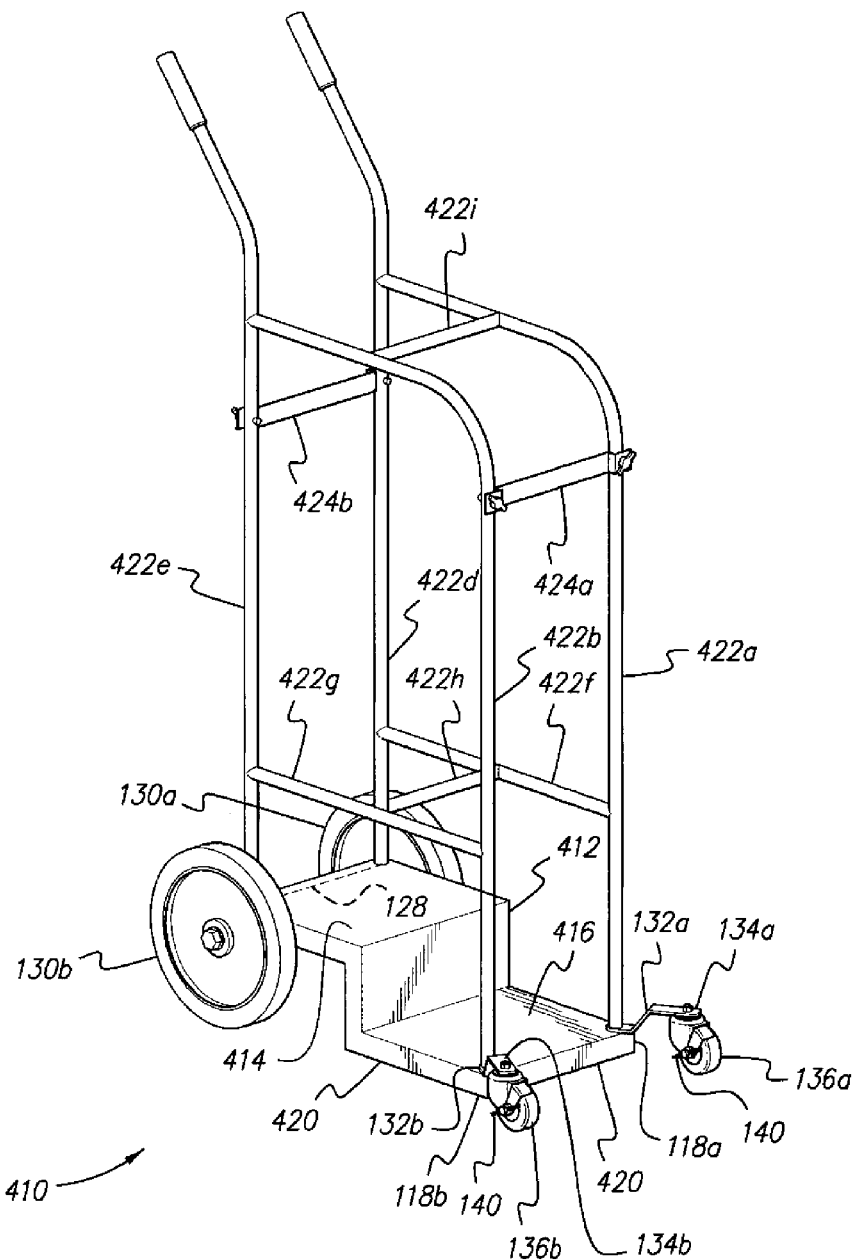
FIG. 4 is a perspective view of a fourth embodiment of a handcart according to the present invention, shown from the right front and illustrating various details thereof.

A rear axle 128 extends laterally across the two rear members 122d and 122e of the superstructure 122. Large diameter left and right rear wheels, respectively 130a and 130b, extend from the respective ends of the axle 128 and immediately outboard the sides of the platform 112. The two rear wheels 130a, 130b are directionally fixed, i.e., they are not steerable relative to the remainder of the structure of the handcart 110. The rear axle 128 is located somewhat above the plane of the load-carrying platform 112, or at least the forward portion 116 thereof (a stepped platform embodiment with a higher rear portion is illustrated in FIG. 4 and discussed in detail further below). The rear axle 128 is located vertically so as to position the platform 112, or more specifically the lowermost edges of the downwardly folded lower flange 120 thereof, very close to the underlying surface when the rear wheels 130a, 130b and the smaller diameter forward casters (discussed further below) are resting upon that surface.

Left and right caster wheel arms, respectively 132a and 132b, extend forwardly and laterally outwardly from the respective left and right front corners 118a and 118b of the platform 112. The two arms 132a, 132b preferably extend essentially diagonally from their respective corners 118a and 118b, i.e., defining essentially equal angles of substantially 135 degrees between the axes of the arms and the edges 120 of the platform 112. However, these angles may be adjusted as desired to provide greater lateral or forward offset. Each of the arms 132a, 132b includes an upwardly offset distal end, respectively 134a and 134b, providing for the attachment of a small diameter caster wheel thereto.

Small diameter left and right caster wheels, respectively 136a and 136b, depend from the upwardly offset distal end 134a, 134b of each arm 132a and 132b. The upwardly offset distal ends 134a, 134b have sufficient vertical offset as to be located above the upper surface plane of the platform 112, as shown clearly in the side elevation view of the lower portion of the handcart in FIG. 5. The configuration illustrated in FIG. 5 for the lower portion of the handcart may be considered to be applicable to all of the handcart embodiments described herein, as well.

Figure 5:
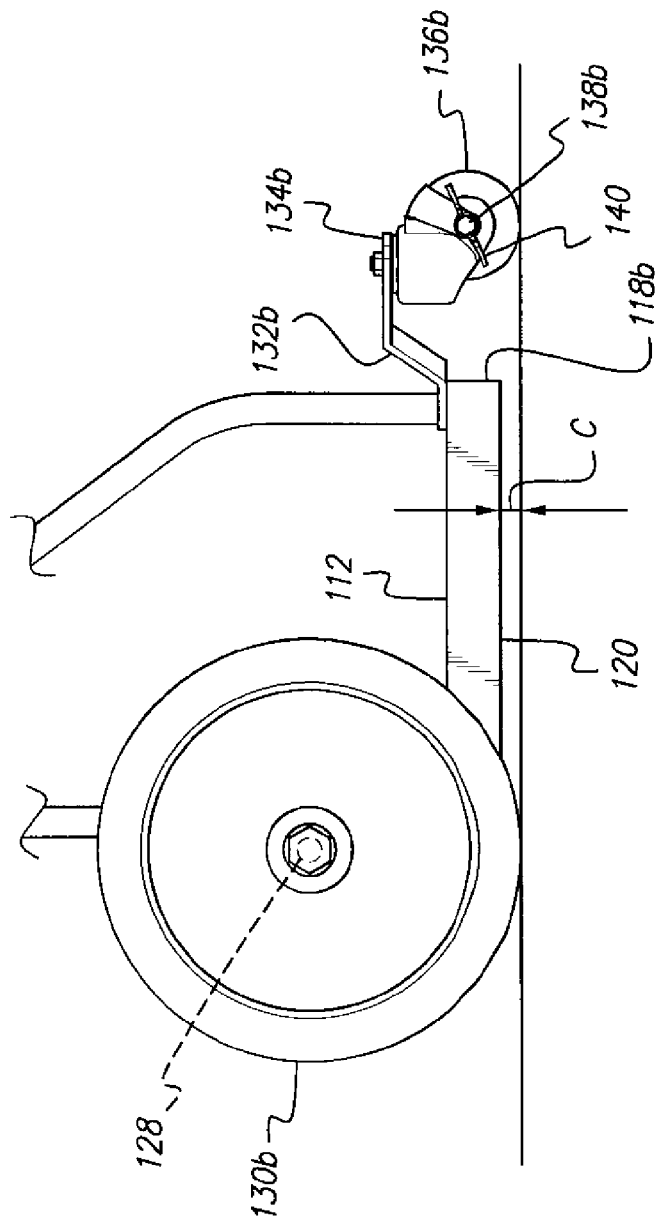
FIG. 5 is a partial right side elevation view of the handcart of FIG. 1, illustrating the low platform level provided by the wheel configuration of the various handcart embodiments.

Even though the caster wheels are of relatively small diameter, i.e., considerably smaller than the larger diameter rear wheels, it will be seen that their diameter is greater than the height of the depending lower edge 120 of the platform 112. Accordingly, the vertical offset of the two caster arms 132a, 132b is sufficient to position the axle, e.g., axle 138b of the caster 136b shown in FIG. 5, above the lowermost edge of the depending lower edge 120 of the platform 112. Along with the raised rear axle 128, this results in a clearance C between the lowermost edge of the lower flange 120 of the platform 112 of only a small fraction of an inch, more or less. The vertical location of the rear axle 128 in combination with the vertical offsets of the two caster wheel arms 132a and 132b, results in the platform 112 being substantially parallel to the underlying surface when all four wheels 130a, 130b, 136a, and 136b are resting on the underlying surface, as shown in FIG. 5.

As the platform 112, or more specifically its depending lower flange 120, is spaced above the underlying surface by means of the support provided by the four wheels 130a, 130b, 136a, and 136b, there is no friction between the underside of the platform and the underlying surface to hold or maintain the position of the cart. Accordingly, the two casters 136a and 136b are preferably provided with selectively operable brakes to keep the cart from rolling inadvertently. The brakes are preferably conventional axially disposed, toe-operated toggle levers 140, as illustrated in the drawing Figs., although other brake types or principles may be incorporated if so desired.

Figure 2:
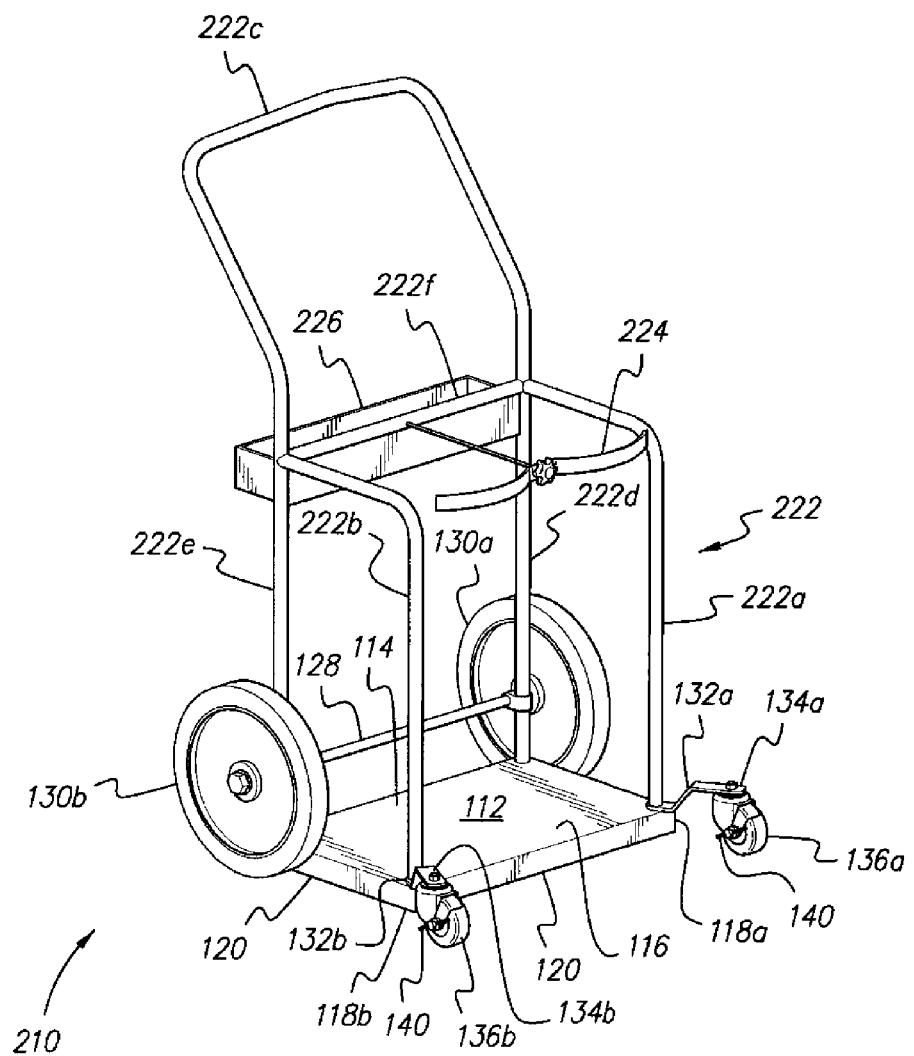
FIG. 2 is a perspective view of a second embodiment of a handcart according to the present invention, shown from the right front and illustrating various details thereof.

FIG. 2 of the drawings illustrates a perspective view of a second embodiment of the handcart, designated as handcart or cart 210. The lower portion of the cart 210 is essentially identical to that of the cart 110 of FIG. 1, with only the superstructure 222 being different. The superstructure 222 is preferably formed of tubular steel and comprises forwardly disposed left and right members 222a and 222b that extend upwardly from the forward corners 118a, 118b of the platform 112, with their upper ends bent to extend rearward to connect to the upwardly extending left and right rear members 222d and 222e. The left and right rear members 222d and 222e may be formed as a single component, with the central portion comprising a rearwardly disposed handle 222c. Additional bracing may be provided by a crossmember 222f extending between the two rear uprights 222d and 222e, at the points of connection with the rearward extending ends of the forward members 222a and 222b. Additional structure may be provided, e.g., a cylinder retaining bracket 224 extending forwardly from the rear crossmember 222f, an accessory tray 226 for holding a striker, different welding tips and/or tip cleaning tools, etc., as desired.

The lower portion of the handcart 210 of FIG. 2 is essentially identical to the corresponding portion of the handcart 110 of FIG. 1, comprising a load-carrying platform 112 having rearward and forward portions 114 and 116, left and right forward corners 118a and 118b, and a depending lower edge or flange 120. The rear axle 128 extends across the lower portions of the two rear uprights 222d and 222e, and is located sufficiently far above the platform 112 to position the lower edge of the depending edge or flange 120 very close to the underlying surface when supported thereon by the large diameter wheels 130a and 130b.

Caster wheel arms 132a and 132b extend forwardly and laterally outwardly from their respective platform forward corners 118a and 118b, with the arms 132a, 132b having distal ends 134a, 134b with small diameter caster wheels 136a, 136b depending respectively therefrom. The wheels 136a, 136b may be equipped with conventional toggle lever type brakes 140. The arms 132a, 132b have essentially the same configuration as those components of FIG. 1, i.e., an upward offset to place the lowermost edge of the depending flange or edge 120 of the platform as low as possible above the underlying surface when all four wheels 130a, 130b, 136a, and 136b of the cart 210 are resting thereon.

Figure 3:
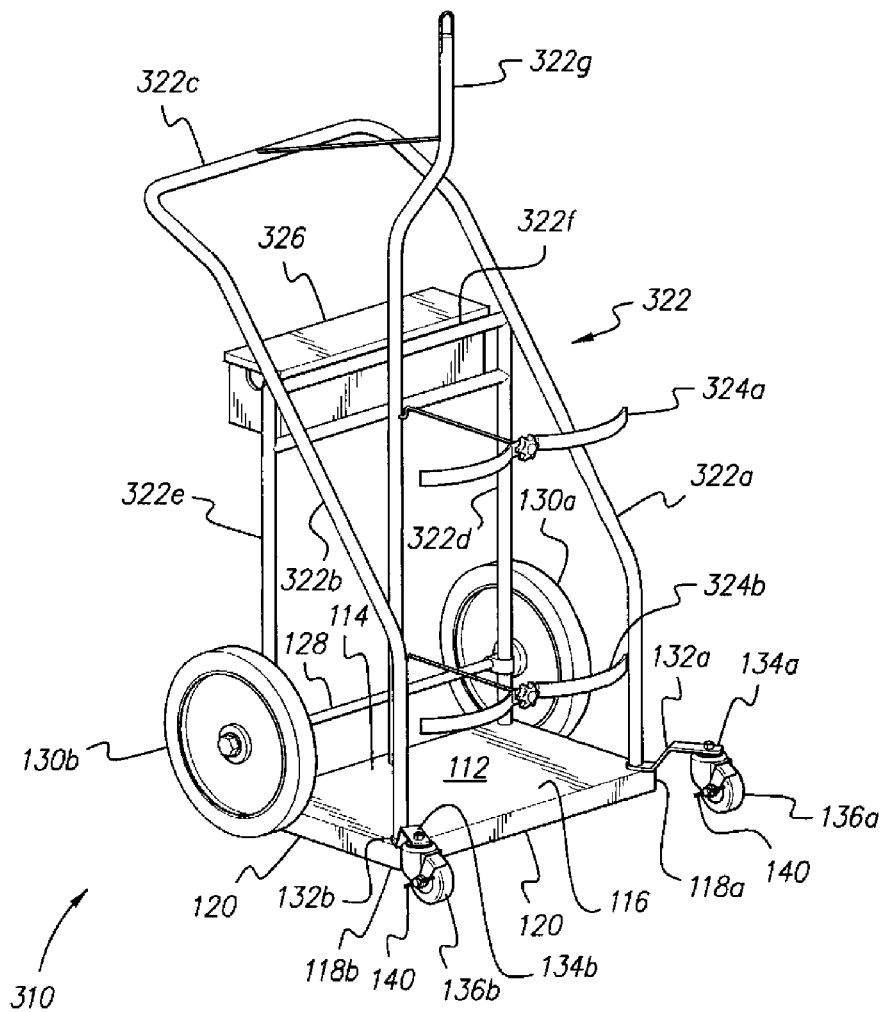
FIG. 3 is a perspective view of a third embodiment of a handcart according to the present invention, shown from the right front and illustrating various details thereof.

FIG. 3 of the drawings illustrates a perspective view of a third embodiment of the handcart, designated as handcart or cart 310. The lower portion of the cart 310 is essentially identical to that of the carts 110 of FIGS. 1 and 210 of FIG. 2, with only the superstructure 322 being different. The superstructure 322 is preferably formed of tubular steel and comprises forwardly disposed left and right members 322a and 322b that extend upwardly and rearward from the forward corners 118a, 118b of the platform 112, with a rearwardly disposed handle 322c joining the upper ends of the two members 322a, 322b. Similarly configured (but shorter) left and right rear members, respectively 322d and 322e, extend upwardly from the rear corners of the platform 112 and are joined by a crossmember 322f that extends generally medially across the two forward members 322a, 322b.

In addition, a lifting arm 322g extends upwardly from the rear edge of the platform 112, and is joined directly to the crossmember 322f and indirectly to the handle 322c by a connecting member. The upper end of the lifting arm 322g is forwardly offset to position it essentially over the center of the load-carrying platform 112. In this manner the lifting arm 322g may be used to hoist or lift the cart 310 and its contents with the cart and contents remaining substantially balanced below the lift point. Alternatively, the lifting arm 322g may be used to tow the cart 310 on its larger diameter rear wheels 130a, 130b.

The various components 322a through 322g may be formed of tubular steel material, or may alternatively be formed of other structural material as desired. Additional structure may be provided, e.g., upper and lower cylinder retaining brackets 324a and 324b extending forwardly from the lifting arm 322g, an accessory tray 326 for holding a striker, different welding tips and/or tip cleaning tools, etc., as desired. The accessory tray 326 of the handcart 310 of FIG. 3 is also equipped with a lid, which feature may be provided for any of the other embodiments of the handcart as well.

The lower portion of the handcart 310 of FIG. 3 is essentially identical to the corresponding portions of the handcart 110 of FIGS. 1 and 210 of FIG. 2, comprising a load-carrying platform 112 having rearward and forward portions 114 and 116, left and right forward corners 118a and 118b, and a depending lower edge or flange 120. The rear axle 128 extends across the lower portions of the two rear uprights 322d and 322e, and is located sufficiently far above the platform 112 to position the lower edge of the depending edge or flange 120 very close to the underlying surface when supported thereon by the large diameter wheels 130a and 130b.

Caster wheel arms 132a and 132b extend forwardly and laterally outwardly from their respective platform forward corners 118a and 118b, with the arms 132a, 132b having distal ends 134a, 134b with small diameter caster wheels 136a, 136b depending respectively therefrom. The wheels 136a, 136b may be equipped with conventional toggle lever type brakes 140. The arms 132a, 132b have essentially the same configuration as those components of FIGS. 1 and 2, i.e., an upward offset to place the lowermost edge of the depending flange or edge 120 of the platform as low as possible above the underlying surface when all four wheels 130a, 130b, 136a, and 136b of the cart 310 are resting thereon.

FIG. 4 of the drawings illustrates a perspective view of a fourth embodiment of the handcart, designated as handcart or cart 410. Much of the lower portion of the cart 410 is essentially identical to that of the carts 110, 210, and 310, but the handcart 410 is significantly narrower than the carts 110, 210, and 310 due to its configuration for carrying two cylinders in tandem on its stepped platform 412, discussed in detail further below.

The superstructure 422 is also different, resembling a narrower configuration of the superstructure 222 of the cart 210 of FIG. 2. The superstructure 422 is preferably formed of tubular steel and comprises forwardly disposed left and right members 422a and 422b that extend upwardly from the forward corners 118a, 118b of the lower forward portion 416 of the platform 412, with their upper ends bent to extend rearward to connect to the upwardly extending left and right rear members 422d and 422e. The left and right rear members 422d and 422e have rearwardly angled upper extremities that serve as handles for the cart 410, although the upper extremities of the rear members 422d and 422e may be connected to provide a generally lateral handlebar, if so desired.

Additional bracing may be provided by a left side lower longitudinal member 422f extending between the left side members 422a and 422d, and a laterally opposed right side lower longitudinal member 422g extending between the right side members 422b and 422e. These two lower members 422f and 422g are connected medially by a lower lateral member 422h, with a corresponding upper lateral member 422i extending between the upper horizontal portions of the left and right forward members 422a and 422b. The two lateral members 422h and 422i are positioned essentially vertically above the center of the platform 412, and serve to separate two cylinders placed in tandem on the cart 410. Additional structure may be provided, e.g., forward and rearward cylinder restraints 424a and 424b extending respectively between the forward members 422a and 422b and between the rearward members 422d and 422e. It will be noted that while no accessory tray is shown for the handcart 410 of FIG. 4, such a tray may be provided therewith as in the other embodiments discussed further above.

The load-carrying platform 412 also differs from the platforms 112, 212, and 312 of the carts of FIGS. 1, 2, and 3. The platform 412 is stepped, with its rearward portion 414 being somewhat higher than its forward portion 416. A generally vertical medial section defines a step between the two portions 414 and 416, with the medial section being located essentially directly beneath the two lateral members 422h and 422i. This configuration provides for the carriage of two cylinders in tandem on the cart 410, with one cylinder being carried on the lower forward portion 416 of the stepped platform 412 and the second cylinder being carried on the raised rearward portion 414 of the platform.

The wheel structure of the handcart 410 of FIG. 4 is essentially identical to the corresponding portions of the handcarts 110, 210 and 310 of FIGS. 1, 2, and 3. The rear axle 128 is essentially the same as the rear axle of the other cart embodiments, but is shown in broken lines in FIG. 4 due to its concealment by the rearward edge of the raised rear portion 414 of the platform 412. The rear axle 128 extends across the lower portions of the two rear uprights 422d and 422e, and is located to position the forward portion of the lower edge of the depending edge or flange 420 of the platform 412 very close to the underlying surface when supported thereon by the large diameter wheels 130a and 130b.

Caster wheel arms 132a and 132b extend forwardly and laterally outwardly from their respective platform forward corners 118a and 118b, with the arms 132a, 132b having distal ends 134a, 134b with small diameter caster wheels 136a, 136b depending respectively therefrom. The wheels 136a, 136b may be equipped with conventional toggle lever type brakes 140. The arms 132a, 132b have essentially the same configuration as those components of FIGS. 1 through 3, i.e., an upward offset to place the lowermost edge of the depending flange or edge 420 of the forward portion 416 of the platform 412 as low as possible above the underlying surface when all four wheels 130a, 130b, 136a, and 136b of the cart 310 are resting thereon.

Each of the carts 110 through 410 has a wheel configuration essentially similar to that illustrated in the side elevation view of FIG. 5, i.e., the lowermost edge of the depending flange 120 (or the forward portion of the flange 420, in the case of the stepped platform 412 of the cart 410 of FIG. 4) is spaced above the underlying surface by some small fraction of an inch, more or less, when all four wheels 130*a*, 130*b*, 136*a*, and 136*b* are resting upon that surface.

Thus, a person using any of the carts described herein need not lift a cylinder (or other object) significantly to load it onto the cart, or at least the forward portion of the platform of the cart in the case of the stepped platform cart 410 of FIG. 4. The round base of conventional cylinders of pressurized gas may be rolled easily onto the platform, or the lowermost portion of the platform, without undue difficulty.

Any of the carts described herein may be moved or rolled on their wheels with their platforms remaining clear of the underlying surface. There is no need to tilt the cart rearward and balance the cart and load thereon to move the cart and its contents, as is the case with most conventional carts.

In addition, the very low platform (or forward portion thereof for the cart of FIG. 4) provides the lowest possible center of gravity for the cart and its contents, thereby greatly increasing stability. Stability is further enhanced by the outwardly disposed caster wheels extending from the forward corners of the platform. Accordingly, the handcart in any of its various embodiments provides greatly enhanced safety and security for the user of the cart, particularly when it is used to carry potentially hazardous objects such as cylinders of pressurized gas for welding or other purposes.

It is to be understood that the present invention is not limited to the embodiments described above, but encompasses any and all embodiments within the scope of the following claims.

I claim:

1. A load-carrying handcart, comprising:
   a platform having an upper, load-carrying surface, rear portion, a forward portion having a lower flange depending therefrom and defining the lower surface of the platform, a left front corner, and a right front corner;
   a superstructure extending upwardly from the platform;
   a rear axle extending laterally across the superstructure and above at least the forward portion of the platform;
   large diameter, directionally fixed rear wheels extending from the rear axle, the rear wheels being disposed laterally outward from the platform;
   left and right cantilevered arms extending diagonally outward from the left front and right front corners of the platform, respectively, each of the arms having a distal end, the distal end of each of the arms being upwardly offset and disposed above at least the forward portion of the platform; and
   a small diameter caster wheel depending from the distal end of each of the arms, each caster wheel has an axle disposed below the forward portion and above the lowermost surface of the platform.

2. The handcart according to claim 1, wherein the rear portion of the platform is stepped above the forward portion of the platform.

3. The handcart according to claim 1, wherein each caster wheel further includes a selectively operable brake.

4. The handcart according to claim 3, wherein each said brake is selectively actuated by an axially disposed toggle lever.

5. The handcart according to claim 1, wherein the superstructure is formed of tubular material.

6. The handcart according to claim 1, wherein the platform being formed of a thin, unbroken sheet of material.

\* \* \* \* \*